(12) United States Patent
Barton et al.

(10) Patent No.: US 12,192,175 B2
(45) Date of Patent: Jan. 7, 2025

(54) INTENT-BASED SECURITY FOR INDUSTRIAL IOT DEVICES

(71) Applicant: Cisco Technology, Inc., San Jose, CA (US)

(72) Inventors: Robert Edgar Barton, Richmond (CA); Thomas Szigeti, Vancouver (CA); Jerome Henry, Pittsboro, NC (US); Ruben Gerald Lobo, Raleigh, NC (US); Laurent Jean Charles Hausermann, Lyons (FR); Maik Guenter Seewald, Nuremberg (DE); Daniel R. Behrens, Chardon, OH (US)

(73) Assignee: Cisco Technology, Inc., San Jose, CA (US)

( * ) Notice: Subject to any disclaimer, the term of this patent is extended or adjusted under 35 U.S.C. 154(b) by 212 days.

(21) Appl. No.: 16/838,822

(22) Filed: Apr. 2, 2020

(65) Prior Publication Data

US 2021/0194851 A1  Jun. 24, 2021

Related U.S. Application Data

(60) Provisional application No. 62/951,645, filed on Dec. 20, 2019.

(51) Int. Cl.
*H04L 9/40* (2022.01)
*G05B 19/05* (2006.01)
(Continued)

(52) U.S. Cl.
CPC .......... *H04L 63/0263* (2013.01); *G05B 19/05* (2013.01); *G06Q 10/0875* (2013.01);
(Continued)

(58) Field of Classification Search
CPC ............. H04L 63/0263; H04L 41/0893; H04L 47/323; H04L 63/20; G05B 19/05
See application file for complete search history.

(56) References Cited

U.S. PATENT DOCUMENTS 9,838,352 B2  12/2017  Wetterwald et al.
10,212,182 B2  2/2019  Wetterwald et al.
(Continued)

FOREIGN PATENT DOCUMENTS

WO  WO-2019172762 A1 * 9/2019 ......... H04L 63/0236
WO  WO-2019190403 A1 * 10/2019 ......... H04L 63/0227

OTHER PUBLICATIONS

Aleksandrova, Mary, "Industrial IoT Security: How to Protect Smart Manufacturing", Jul. 2019, 13 pages, Eastern Peak.
(Continued)

*Primary Examiner* — Hee Soo Kim
(74) *Attorney, Agent, or Firm* — BEHMKE INNOVATION GROUP LLC; James M. Behmke; Keith O. Mitchell

(57) ABSTRACT

According to one or more embodiments of the disclosure, a device in a network identifies a packet sent via the network towards an endpoint as being a control packet for the endpoint. The device extracts one or more control parameter values from the control packet. The device compares the one or more control parameter values to a policy associated with the endpoint. The device initiates a corrective measure, based on a determination that the one or more control parameter values violate the policy associated with the endpoint.

18 Claims, 7 Drawing Sheets

(51) Int. Cl.
　　*G06Q 10/0875* (2023.01)
　　*H04L 12/46* (2006.01)
　　*H04L 41/0803* (2022.01)
　　*H04L 41/0893* (2022.01)
　　*H04L 43/026* (2022.01)
　　*H04L 47/20* (2022.01)
　　*H04L 47/2441* (2022.01)
　　*H04L 47/32* (2022.01)

(52) U.S. Cl.
　　CPC ...... *H04L 12/4641* (2013.01); *H04L 41/0803* (2013.01); *H04L 41/0893* (2013.01); *H04L 43/026* (2013.01); *H04L 47/20* (2013.01); *H04L 47/2441* (2013.01); *H04L 47/323* (2013.01); *H04L 63/20* (2013.01)

(56) References Cited

U.S. PATENT DOCUMENTS

| | | | |
|---|---|---|---|
| 10,298,542 | B2 | 5/2019 | Thubert et al. |
| 10,530,665 | B2 | 1/2020 | Thubert et al. |
| 2017/0295071 | A1* | 10/2017 | Yang ............... H04L 41/145 |
| 2018/0276254 | A1* | 9/2018 | Whitlock ............. G06F 16/11 |
| 2019/0014137 | A1* | 1/2019 | Du .................. G06F 16/2372 |
| 2019/0028434 | A1* | 1/2019 | Cianfrocca ........ H04L 63/0227 |
| 2019/0220760 | A1* | 7/2019 | Kolar ................ H04L 41/142 |
| 2019/0238443 | A1 | 8/2019 | Di Pietro et al. |
| 2019/0280942 | A1 | 9/2019 | Cote et al. |
| 2019/0306011 | A1* | 10/2019 | Fenoglio ............. G06N 5/046 |
| 2019/0342195 | A1 | 11/2019 | Mermoud et al. |
| 2019/0349426 | A1* | 11/2019 | Smith .................... H04W 4/08 |
| 2019/0356533 | A1 | 11/2019 | Vasseur et al. |
| 2020/0007395 | A1* | 1/2020 | Fainberg ............. H04L 63/0263 |
| 2020/0021560 | A1* | 1/2020 | Hefley ................. G06F 21/552 |
| 2020/0022016 | A1 | 1/2020 | Fenoglio et al. |
| 2020/0358794 | A1* | 11/2020 | Vasseur ................ G06F 16/285 |
| 2021/0099424 | A1* | 4/2021 | Li ........................ H04L 63/0227 |

OTHER PUBLICATIONS

Gonzalez, Carlos, "Is Intent-Based Networking the Future of IoT?", online: https://www.machinedesign.com/automation-iiot/article/21836153/is-intentbased-networking-the-future-of-iot, Nov. 2017, 14 pages, Machine Design.
Vasseur, et al., "Securing Your Network with Anomaly Detection Using Distributed Learning Architecture (Learning Networks)", 2016, 39 pages, Cisco.
"Asset Intelligence: Focus on the OT and IoT Incidents that Matter", Data Sheet, 2020, 4 pages, Nozomi Networks, Inc.
"Create a Tag", Jan. 2020, 1 page, ExtraHop Networks, Inc.
"Devices", Jan. 2020, 8 pages, ExtraHop.
"Extreme Visibility: Why Extreme Visibility in Industrial Networks is no Longer just a Nice-to-Have", White Paper, Dec. 2018, 5 pages, Claroty, Clarity for OT Networks.
"Find a Device", Jan. 2020, 8 pages, ExtraHop.
"Introduction to the ExtraHop System", Jan. 2020, 7 pages, ExtraHop.
"OT and IoT Security and Visibility", Solution Brief, 2020, 12 pages, Nozomi Networks, Inc.
"Threat Intelligence", Data Sheet, 2020, 4 pages, Nozomi Networks, Inc.
"Using Service Classification to Build and Application-Aware NFV Infrastructure for Virtual CPE Services", 2015, 6 pages, Intel Corporation.

* cited by examiner

COMPONENT TAGS

- ☐ Components without tags
- ☐ ▼ Device - Level 0-1
  - ☐ IO Module (3)
  - ☐ Wireless IO Module (2)
- ☐ ▼ Device - Level 2
  - ☐ Citect Alarm Server
  - ☐ Citect IO Server
  - ☐ Citect Report Server
  - ☐ Citect Trend Server
  - ☐ Engineering Station (3)
  - ☐ Master
  - ☐ PLC (9)
  - ☐ SCADA Station (3)
  - ☐ Slave
  - ☐ Train
- ☐ ▼ Device - Level 3-4
  - ☐ Admin Server (1)
  - ☐ DNS Server (2)
  - ☐ Database Server
  - ☐ Email Server
  - ☐ File Transfer Server
  - ☐ HTTP Client
  - ☐ Historian
  - ☐ Host Config Server (3)
  - ☐ Key Management Server
  - ☐ License Management Server
  - ☐ Log Server
- ☐ ▼ Network analysis
  - ☐ Port Scan
  - ☐ Port Scan Target
  - ☐ Public IP (19)
- ☐ ▼ Software
  - ☐ Active Directory
  - ☐ CodeSys
  - ☐ DFS
  - ☐ Lotus notes
  - ☐ Microsoft Exchange
  - ☐ NSIS
  - ☐ NetLogon
  - ☐ PI Osisoft
  - ☐ WINS
  - ☐ WMI
  - ☐ WinRM
  - ☐ Windows (10)
  - ☐ Windows Audio
  - ☐ Windows CSP
  - ☐ Windows Connection Manager
  - ☐ Windows DTCPing
  - ☐ Windows File Protection
  - ☐ Windows Messenger Service
  - ☐ Windows Network DDE
  - ☐ Windows Plug and Play
  - ☐ Windows SCM
  - ☐ Windows SecondaryLogon
  - ☐ Windows Task Scheduler
  - ☐ Windows WebClient

- ⌁ ACTIVITY TAGS
  - ☐ Activities without tags
  - ☐ ▼ ⬨ Control system behavior
    - ☐ ⬨ Block Download
    - ☐ ⬨ Control action (1)
    - ☐ ⬨ Controller Info
    - ☐ ⬨ Controller Name
    - ☐ ⬨ Data Push
    - ☐ ⬨ Device Init (1)
    - ☐ ⬨ Diagnostics
    - ☐ ⬨ Emergency Brake
    - ☐ ⬨ Firmware Download
    - ☐ ⬨ Firmware Update
    - ☐ ⬨ Force Variable
    - ☐ ⬨ Heartbeat
    - ☐ ⬨ Hot Reboot
    - ☐ ⬨ Insert Program
    - ☐ ⬨ Installed Modules
    - ☐ ⬨ Memory Formatting
    - ☐ ⬨ Network Configuration
    - ☐ ⬨ Operational Change
    - ☐ ⬨ PLC Clock
    - ☐ ⬨ PLC Reservation
    - ☐ ⬨ Password Change
    - ☐ ⬨ Program Download (4)
    - ☐ ⬨ Program Upload (2)
    - ☐ ⬨ Programming CPU
- ☐ ▼ ⬨ IT behavior
  - ☐ ⬨ Active Directory Replication
  - ☐ ⬨ Admin (1)
  - ☐ ⬨ Antivirus
  - ☐ ⬨ Authentication (1)
  - ☐ ⬨ Database
  - ☐ ⬨ Email
  - ☐ ⬨ Host Config (11)
  - ☐ ⬨ IT File Sync
  - ☐ ⬨ IT File Transfer
  - ☐ ⬨ Key management
  - ☐ ⬨ License Management
  - ☐ ⬨ Log
  - ☐ ⬨ Net Management (3)
  - ☐ ⬨ Net Routing
  - ☐ ⬨ Ping (10)
  - ☐ ⬨ Power Management
  - ☐ ⬨ Printer Management
  - ☐ ⬨ Procedure Call
  - ☐ ⬨ Proxy
  - ☐ ⬨ Remote access (1)
  - ☐ ⬨ Streaming
  - ☐ ⬨ Time Management (9)
  - ☐ ⬨ VPN
  - ☐ ⬨ Web (3)
  - ☐ ⬨ Windows DFS Replication
  - ☐ ⬨ Windows Discovery
- ☐ ▼ ◆ Network analysis
  - ☐ ◆ Authentication Error
  - ☐ ◆ Broadcast (81)

| | Component | |
|---|---|---|
| < | | × |

Yokogawa 192.168.11...
IP: 192.168.119.131
MAC: 00:00:64:98:b7:6b

First activity
Sep 24, 2019 4:34:12 PM

Last activity
Sep 25, 2019 10:10:09 AM

Tags: ⬦ Engineering Station, ⬦ PLC, ⬦ CodeSys, ⬦ Lotus notes, ⬦ PI Osisoft

Activity tags: ⬦ Heartbeat, ⬦ Read Var, ⬦ Citect Alarm, ⬦ Citect IO, ⬦ Citect Report, ⬦ Citect Trend, ⬦ SCADA Station, ⬦ Authentication, ⬦ Database, ⬦ Net Management ...22+

Properties: vendor-name: Yokogawa Digital Computer Corporation
name: Yokogawa 192.168.119.131
ip: 192.168.119.131
public-ip: no
mac: 00:00:64:98:b7:6b

FIG. 5

INTENT-BASED SECURITY FOR INDUSTRIAL IOT DEVICES

RELATED APPLICATION

This application claims priority to U.S. Provisional Patent Application No. 62/951,645, filed on Dec. 20, 2019, entitled "INTENT-BASED SECURITY FOR INDUSTRIAL IOT DEVICES" by Barton et al., the contents of which are incorporated by reference herein.

TECHNICAL FIELD

The present disclosure relates generally to computer networks, and, more particularly, to intent-based security for industrial Internet of Things (IoT) devices.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room when a person enters the room. Vehicles are another class of 'things' that are being connected via the IoT for purposes of sharing sensor data, implementing self-driving capabilities, monitoring, and the like.

The nature of the IoT makes network security particularly challenging, especially in the case of industrial settings, such as factories, mines, ports, power substations, and the like. Indeed, these types of networks are typically large scale in nature, include a variety of legacy devices that do not support authentication methods (e.g., 802.1x) and lack system patching, making it very difficult to define adequate security policies for each device.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A-4B illustrate example displays of component and activity tags;

FIG. 5 illustrates an example screen capture of an asset profile; and

DESCRIPTION OF EXAMPLE EMBODIMENTS

Overview

Figure 1:
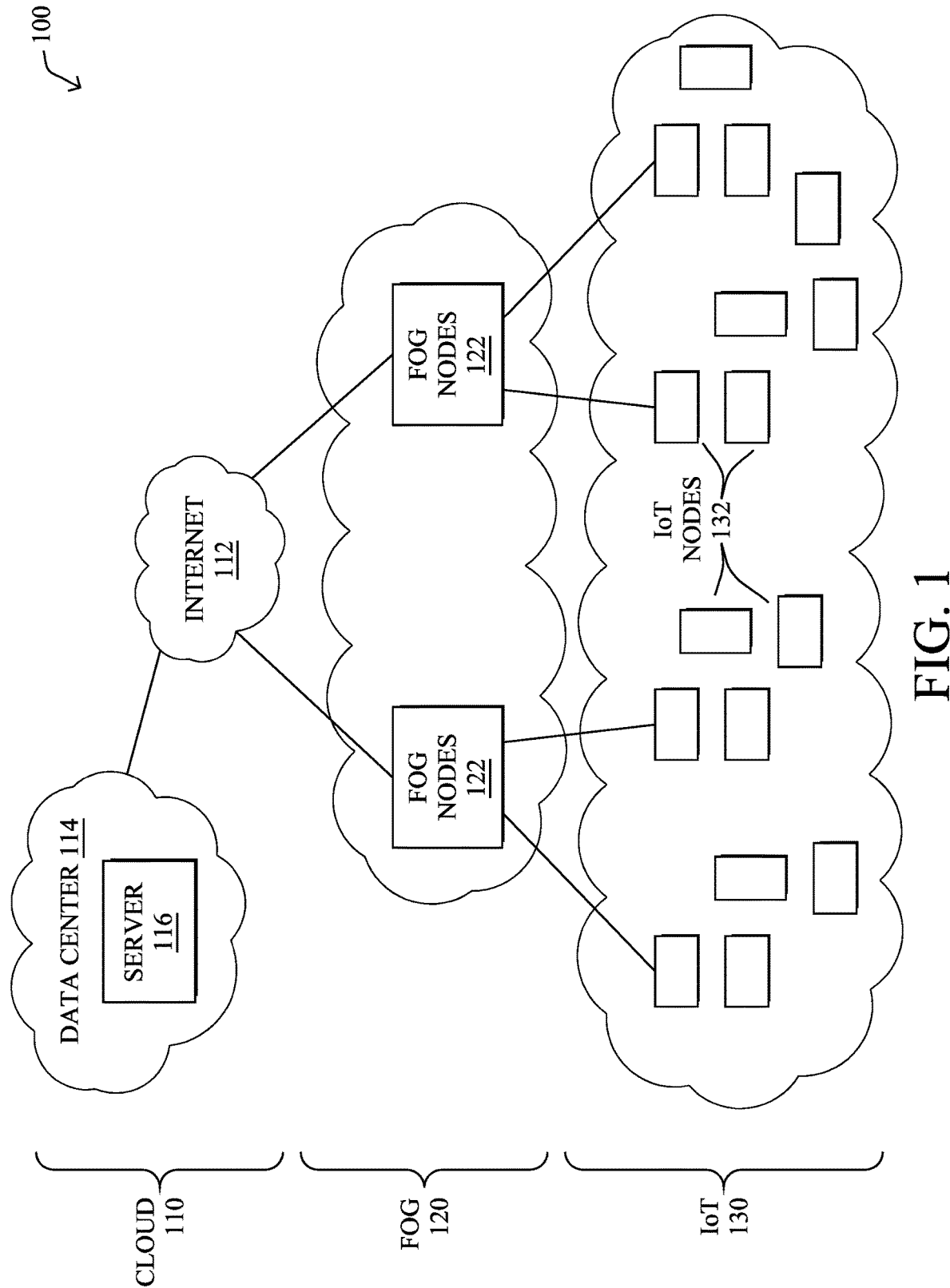
FIG. 1 illustrate an example network.

According to one or more embodiments of the disclosure, a device in a network identifies a packet sent via the network towards an endpoint as being a control packet for the endpoint. The device extracts one or more control parameter values from the control packet. The device compares the one or more control parameter values to a policy associated with the endpoint. The device initiates a corrective measure, based on a determination that the one or more control parameter values violate the policy associated with the endpoint.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or Powerline Communication networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, powerline communication links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, fog layer 120, and IoT device layer 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. For example, fog nodes/devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, powerline communication protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), powerline communication protocols, or other shared-media protocols where appropriate. In this context, a protocol consists of a set of rules defining how the nodes interact with each other.

Figure 2:
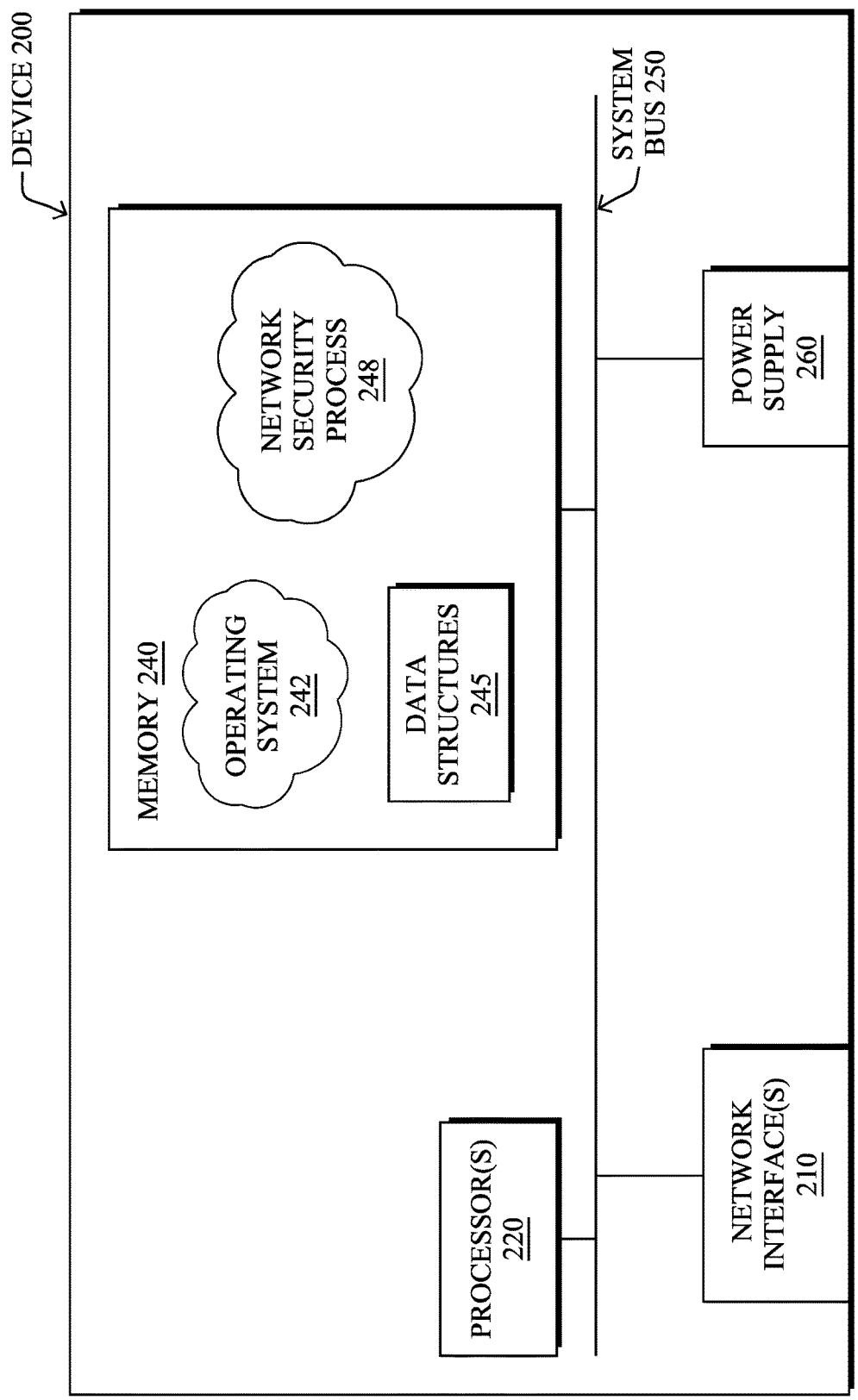
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections 210, e.g., wireless and wired/physical connections, and that the view herein is merely for illustration. Also, while the network interface 210 is shown separately from power supply 260, for powerline communications the network interface 210 may communicate through the power supply 260, or may be an integral component of the power supply. In some specific configurations the powerline communication signal may be coupled to the power line feeding into the power supply.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network security process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, network security process 248 may be configured to perform any or all of the following tasks:
1. Identifying and classifying devices in the network—this may entail, for example, determining the make, model, software configuration, type, etc. of a given device.
2. Discerning operational insights about a device—for example, network security process 248 may assess the traffic of a particular device, to determine what the device is doing, or attempting to do, via the network. Such information may take the form of device details and communication maps for the device. In further cases, the device functions and application flows may be converted into tags and/or events for presentation to a user interface. Further, process 248 may also track variable changes, to monitor the integrity of the industrial workflow.
3. Detecting anomalies—network security process 248 may also assess the behaviors of a device on the network, to determine whether its behaviors are anomalous. In various embodiments, this may entail network security process 248 determining whether the behavior of the device has changed significantly over time and/or does not fit the expected behavioral pattern for its classification. For example, if the device is identifies as being a temperature sensor that periodically sends temperature measurements to a supervisory service, but the device is instead communicating data elsewhere, process 248 may deem this behavior anomalous.

In various embodiments, network security process 248 may employ any number of machine learning techniques, to assess the gathered telemetry data regarding the traffic of the device. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, network security process 248 can use the model M to classify new data points, such as information regarding new traffic flows in the network. Often, M is a statistical model, and the cost function is inversely proportional to the likelihood of M, given the input data.

In various embodiments, network security process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "suspicious." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that network security process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, network security process 248 may assess the captured telemetry data on a per-flow basis. In other embodiments, network security process 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

As noted above, the very nature of the IoT presents certain challenges, from a security standpoint. Indeed, the diversity of the various devices in the network in terms of their hardware, software, and purposes (e.g., sensing, controlling, etc.), as well as the specific configuration of the network (e.g., cells in an industrial network, etc.), can make enforcing network security particularly challenging.

Best practices for Industrial IoT security typically follow standardized models, such as IEC 62443. This security model implements both operational technology (OT) and information technology (IT) security levels and establishes how security should be designed in industrial systems. Furthermore, it describes how security between levels is accomplished through the use of controlled conduits. However, industrial security remains very difficult to enforce, as evidenced by recent industrial attacks where this model was in place. A superior approach would be to leverage intent-based networking, complete with abstraction, automation and analytics, to define, enforce and assure IoT security policies.

It is also important to recognize that IoT devices typically follow a very well prescribed communication profile (e.g., to which devices they should be communicating, on what protocol, and what the protocol should be doing). For instance, a supervisory control and data acquisition (SCADA) slave should only ever communicate to a SCADA master on an established port and should only execute allowable commands. However, it remains very difficult to both 1.) verify that the things, such as intelligent electronic devices, programmable logic controllers (PLCs), variable-frequency drive (VFD), human-machine interfaces (HMIs), input/output (I/O) controllers, etc., are communicating in the expected way and 2.) control their behaviors such that any unexpected network attacks are isolated.

Even when the communications between endpoints are seemingly innocuous, there has been a recent trend in malware taking advantage of these communications to mo damage equipment. In these forms of attacks, an infected endpoint can send control commands to another endpoint, with whom communication is allowed, that can damage or disrupt the operations of the equipment and, potentially, the industrial environment as a whole. For example, malicious SCADA commands to a PLC could cause the PLC to drive a motor in an unsafe way, cause power to be turned off or on to a circuit (e.g., a feeder in an electrical power station), or the like.

Intent-Based Security for Industrial IoT Devices

The techniques herein introduce a network architecture implementing intent-based security for an IoT network, such as an industrial IoT network. In some aspects, the proposed architecture takes a holistic approach to network security that relies on information and processing from a number of different sources in the network, such as industrial firewalls, lightweight telemetry sensors, and services such as authentication, authorization, and accounting (AAA) services, and the like.

Illustratively, the techniques described herein may be performed by hardware, software, and/or firmware, such as in accordance with the network security process 248, which may include computer executable instructions executed by the processor 220 (or independent processor of interfaces 210) to perform functions relating to the techniques described herein.

Specifically, according to various embodiments, a device in a network identifies a packet sent via the network towards an endpoint as being a control packet for the endpoint. The device extracts one or more control parameter values from the control packet. The device compares the one or more control parameter values to a policy associated with the endpoint. The device initiates a corrective measure, based on a determination that the one or more control parameter values violate the policy associated with the endpoint.

Figure 3:
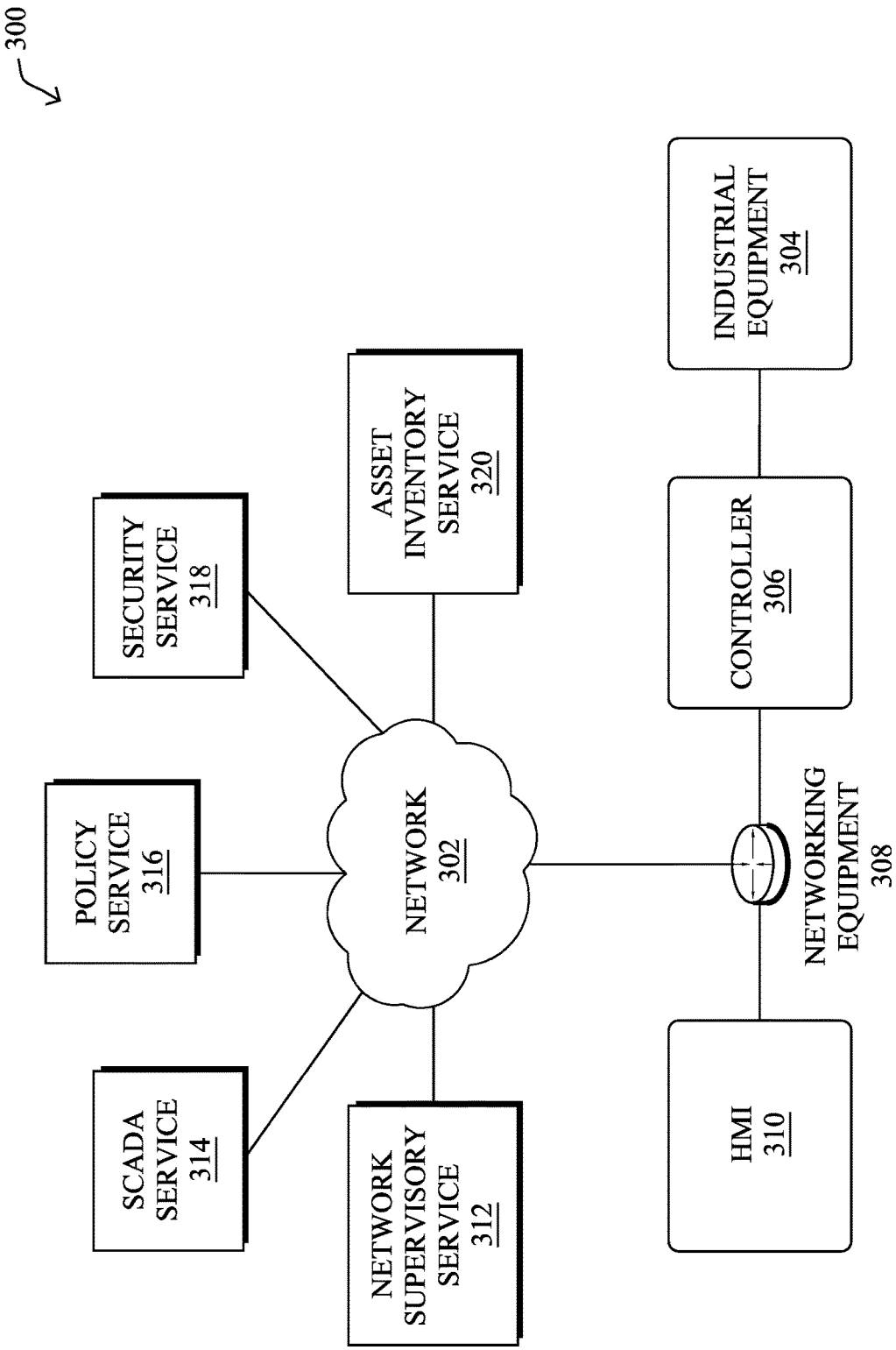
FIG. 3 illustrates an example network architecture for an industrial network.

Operationally, FIG. 3 illustrates an example network architecture 300 for an industrial network, according to various embodiments. As shown, architecture 300 may include industrial equipment 304 connected to a controller 306, such as a PLC, a VFD, or the like, that controls the operations of industrial equipment 304. In turn, controller 306 for industrial equipment 304 may be connected to an HMI 310 via networking equipment 308, allowing a human user to interface with it (e.g., to visualize the industrial process, issue commands, etc.). In addition, networking equipment 308 may also provide connectivity via the greater network 302 to any number of network services 312-320 provided in the local network of networking equipment 308 and/or remotely. For example, services 312-320 may be implemented in the local network via dedicated equipment or virtualized across any number of devices (e.g., networking equipment 308). In other cases, services 312-320 may be provided by servers in a remote data center, the cloud, or the like.

As would be appreciated, industrial equipment 304 may differ, depending on the industrial setting in which architecture 300 is implemented. In many cases, industrial equipment 304 may comprise an actuator such as, but not limited to, a motor, a pump, a solenoid, or the like. In other cases, industrial equipment 304 may include a circuit and controller 306 may control the powering of the circuit.

Industrial equipment 304 may also include any number of sensors configured to take measurements regarding the physical process implemented by industrial equipment 304. For example, such sensors may take temperature readings, distance measurements, humidity readings, voltage or amperage measurements, or the like, and provide them to controller 306 for industrial equipment 304. During operation, controller 306 may use the sensor data from industrial equipment 304 as part of a control loop, thereby allowing controller 306 to adjust the industrial process as needed.

HMI 310 may include a dedicated touch screen display or may take the form of a workstation, portable tablet or other handheld, or the like. Thus, during operation, visualization data may be provided to HMI 310 regarding the industrial process performed by industrial equipment 304. For example, such visualizations may include a graphical representation of the industrial process (e.g., the filling of a tank, etc.), the sensor data from industrial equipment 304, the control parameter values used by controller 306, or the like. In some embodiments, HMI 310 may also allow for the reconfiguration of controller 306, such as by adjusting its control parameters for industrial equipment 304 (e.g., to shut down the industrial process, etc.).

Networking equipment 308 may include any number of switches, routers, firewalls, telemetry exporters and/or collectors, gateways, bridges, and the like. In some embodiments, these networking functions may be performed in a virtualized/containerized manner. For example, a telemetry exporter may take the form of a containerized application installed to networking equipment 308, to collect and export telemetry regarding the operation networking equipment 308 (e.g., queue state information, memory or processor resource utilization, etc.) and/or network 302 (e.g., measured delays, drops, jitter, etc.).

In some embodiments, at least a portion of network 302 may be implemented as a software-defined network (SDN). In such implementations, control plane decisions by the networking equipment of network 302, such as networking equipment 308, may be centralized with an SDN controller. For example, rather than networking equipment 308 establishing routing paths and making other control decisions, individually, such decisions can be centralized with an SDN controller (e.g., network supervisory service 312, etc.).

During operation, network supervisory service 312 may function to monitor the status and health of network 302 and networking equipment 308. An example of such a network supervisory service is DNA-Center by Cisco Systems, Inc. For example, in some implementations, network supervisory service 312 may take the form of a network assurance service that assesses the health of network 302 and networking equipment 308 through the use of heuristics, rules, and/or machine learning models. In some cases, this monitoring can also be predictive in nature, allowing network supervisory service 312 to predict failures and other network conditions before they actually occur. In either case, network supervisory service 312 may also provide control over network 302, such as by reconfiguring networking equipment 308, adjusting routing in network 302, and the like. As noted above, network supervisory service 312 may also function as an SDN controller for networking equipment 308, in some embodiments.

As shown, architecture 300 may also include SCADA service 314 which supervises the operation of the industrial process. More specifically, SCADA service 314 is may communicate with controller 306, to receive data regarding the industrial process (e.g., sensor data from industrial equipment 304, etc.) and provide control over controller 306, such as by pushing new control routines, software updates, and the like, to controller 306.

As would be appreciated, SCADA service 314, controller 306, and/or HMI 310 may communicate using an automation protocol. Examples of such protocols may include, but are not limited to, Profibus, Modbus, DeviceNet, HART, DNP3, IEC 61850, IEC 60870-5, and the like. In addition, different protocols may be used within network 102 and among networking equipment 308, depending on the specific implementation of architecture 300. Further, different portions of network 302 may be organized into different cells or other segmented areas that are distinct from one another and interlinked via networking equipment 308.

Architecture 300 may also include a policy service 316 that is responsible for creating and managing security and access policies for endpoints in network 302. An example of such a policy service 316 is the Identity Services Engine (ISE) by Cisco Systems, Inc. In various embodiments, as detailed below, policy service 316 may also be configured to identify the types of endpoints present in network 302 (e.g., HMI 310, controller 306, etc.) and their corresponding actions/functions. In turn, this information can be used to drive the policies that policy service 316 creates.

Security service 318 is configured to enforce the various policies created and curated by policy service 316 in the network. For example, such policies may be implemented by security service 318 as access control lists (ACLs), firewall rules, or the like, that are distributed to networking equipment 308 for enforcement.

According to various embodiments, architecture 300 may also include asset inventory service 320 that is used to collect information about learned assets/endpoints in network 302 and maintain an inventory of these various devices in network 302. In various embodiments, asset inventory service 320 may do so by embedding sensing modules in networking equipment 308 which passively analyze communications between endpoints. The sensors may use deep packet inspection (DPI) to not only identify the protocols in use by a given packet (e.g., the automation protocol used between HMI 310, controller 306, and SCADA service 314), but also understand the action(s) that are being communicated and to classify both the type of device/component and its application behavior.

For example, when a sensor module executed by networking equipment 308 identifies the use of an automation protocol by a packet, it may examine the payload of each flow to identify any or all of the following:
  The device type (e.g., based on passive scan of traffic and matching a known criterion, the device is classified).
  The software and/or hardware versions of the device.
  MAC and IP addresses of all devices with which the discovered device is communicating.
  The activity profile of the device (e.g., how is it trying to communicate), and the protocol(s) it is using.
  The commands that are being passed (e.g., SCADA commands, etc.), down to the specific control parameter values.

The sensor modules of networking equipment 308 then then organize the collected information into meaningful tags. In general, these tags are simply a way to categorize devices and their behaviors, similar to the same way a human may look at a pen or a pencil and categorize them as writing instruments. Each device can also have multiple tags associated with it, such as the following:
  Component Tags—these tags identify device specific details (e.g., Device ID, SCADA station, PLC, Windows device, etc.).
  Activity Tags—these tags identify what the device is doing at the protocol level (Programming CPU, Heartbeat, Emergency Break, Data Push).
  User-Defined Tags—these could be custom tags to supply additional context (e.g. "Cell 1 Tag").
  Dynamically Generated Tags these could be added dynamically (e.g., using ML) to signify whether the behavior of the device is normal or anomalous, or for other dynamic conditions.
  Scalable Group Tags—These tags are applied to specific packet flows between a defined group of devices/services in the network. For example, in the case shown, HMI 310, controller 306, and SCADA service 314 may be tagged as belonging to a particular group.

The sensor modules embedded in networking equipment 308 may also collect metadata about the communicating devices/endpoints, including its network identifiers (e.g., IP and MAC addresses), vendor, device-type, firmware version, the switch ID and port where the device is connected, etc. As the sensor module learns details of a new device/ endpoint in network 302, it may send its collected metadata about that device, along with its tags, to the asset inventory service 320.

In this manner, asset inventory service 320 may maintain an inventory of each of the endpoint devices in network 302, their associated tags, and their metadata. Thus, as new devices are discovered in network 302, their profile information is added to the live inventory of devices maintained by asset inventory service 320. As noted above, the various tags applied by the sensor modules deployed to networking equipment 308 and used by asset inventory service 320 may be predefined or may, via a user interface (not show) be user-defined.

FIGS. 4A-4B illustrate example displays 400, 410, respectively, showing component and activity tags, in some embodiments. As shown, the various component tags can be used to identify a particular endpoint or other device in the network by its type (e.g., PLC, SCADA station, etc.), its software (e.g., CodeSys, Windows, etc.). In addition, analysis of the traffic of the device can also lead to various activity tags being applied to that device, as well. For example, such activity tags may distinguish between control system behaviors (e.g., insert program, device init., etc.) and IT behaviors (e.g., host config., ping, etc.).

Referring again to FIG. 3, to facilitate the labeling of devices in network 302 using tags, asset inventory service 320 may also leverage device classification functions provided by policy service 316, to identify the component and activity tags of a particular device in network 302 under scrutiny. In general, device classification (also known as "device profiling") has traditionally used static rules and heuristics for the determination. In further embodiments, the device classification by policy service 316 can be achieved by applying a trained machine learning-based classifier to the captured telemetry data from networking equipment 308. Such telemetry data can also take the form of information captured through active and/or passive probing of the device. Notably, this probing may entail policy service 316 sending any or all of the following probes via networking equipment 308:

Dynamic Host Configuration Protocol (DHCP) probes with helper addresses
SPAN probes, to get messages in INIT-REBOOT and SELECTING states, use of ARP cache for IP/MAC binding, etc.
Netflow probes
HyperText Transfer Protocol (HTTP) probes to obtain information such as the operating system (OS) of the device, Web browser information, etc.
Remote Authentication Dial-In User Service (RADIUS) probes.
Simple Network Management Protocol (SNMP) to retrieve Management Information Base (MIB) object or receives traps.
Domain Name System (DNS) probes to get the Fully Qualified Domain Name (FQDN)
etc.

Further information that may be captured by networking equipment 308 and reported via telemetry data to policy service 316 may include traffic behavioral characteristics of the traffic of a device, such as the communication protocols used, flow information, timing and pattern data, and the like. In addition, the telemetry data may be indicative of the operational intent of the endpoint device (e.g., controller 306, HMI 310, etc.).

According to various embodiments, additional information that policy service 316 and asset inventory service 320 may use to tag the various devices/components in network 302 may include any or all of the following:

Manufacturer's Usage Description (MUD) information—As proposed in the Internet Engineering Task Force (IETF) draft entitled, "Manufacturer Usage Description Specification," devices may be configured by their manufacturers to advertise their device specifications. Such information may also indicate the intended communication patterns of the devices.
Asset Administration Shell data—this is an Industry 4.0 method to express how an IoT device should behave, including expected communication patterns.
IEC 61850 Substation Configuration Language (SCL) data—this is a language that is used primarily in the utility industry to express Intelligent Electronic Device (IED) intent.
Open Platform Communication Unified Architecture (OPC UA) data—such data provides industrial models used in manufacturing contexts.

Thus, policy service 316, asset inventory service 320, and the sensor modules and telemetry exporters of networking equipment 308 may operate in conjunction with one another to apply various tags to the devices in network 302 and their traffic flows.

FIG. 5 illustrates an example screen capture 500 of an asset profile, in some embodiments. Notably, the techniques herein have been implemented as part of a prototype system and screen capture 500 is from that prototype system. As can be seen, a particular asset has been identified as a Yokogawa device and has been tagged with various component and activity tags (e.g., PLC, CodeSys, Citect Report, etc.). This profile may be stored by the asset inventory service (e.g., service 320 in FIG. 3) and provide to a user interface, allowing the user to quickly learn information about the device. Such information can also be automatically updated over time, using the techniques herein.

Referring again to FIG. 3, policy service 316 may maintain any number of policies that define the expected behaviors of a given device in network 302, in various embodiments. For example, based on the asset profile of controller 306, policy service 316 may determine that controller 306 is a PLC and associate a policy with controller 306 only allows HMI 310 and SCADA service 314 to communicate with controller 306 via network 302. In turn, policy service 316 may provide the policy to security service 318 and pushed to networking equipment 308 for enforcement.

According to various embodiments, policy service 316 may also associate application-layer policies to an endpoint device, based on its asset profile. Such policies may specify the set of commands (e.g., control parameter values) that are expected between the device and another particular device in the network. For example, assume that controller 306 is a PLC that controls a motor. In such a case, the policy may specify that controller 306 should keep the operating temperature of the industrial process performed by industrial equipment 304 within a specified temperature range, the rotations per minute (RPMs) of a motor within a specified, or the like. In other cases, the policy may specify that controller should not power a circuit on or off, such as during particular times or on certain days.

Policy service 316 may enact enforcement of the policies for a particular endpoint in network 302 (e.g., controller 306) via security service 318. For example, security service 318 may translate the policy from policy service 316 into a set of one or more firewall rules and deploy those rules to a stateful firewall in networking equipment 308. In other embodiments, the policy may be implemented by security service 318 by pushing the policy to a router, switch, telemetry collector, or the like, in networking equipment 308, to enforce the policy on any packet traversing that device.

Once the policies have been deployed to networking equipment 308, the executing device may analyze each of the packets passing through the device. In turn, it may evaluate whether the packet violates any of the policies and, if so, initiate a corrective measure. For example, the device may block the packet from being delivered and/or raise an alert that a possible attack has been detected (e.g., via security service 318).

In the case of a policy that implements a security group, the networking equipment 308 evaluating a packet may use the policy to validate whether the sender and destination are authorized to communicate with one another. For example, if a packet is sent to controller 306 by an endpoint other than HMI 310 or SCADA service 314, the networking equipment may determine that this is a policy violation.

According to various embodiments, through the use of DPI or other packet inspect technique, the networking equipment 308 that receives a packet may also evaluate the protocol(s) in use by the packet. In doing so, it can enforce policies that restrict which protocol(s) are used between endpoints that would otherwise be authorized to communicate with one another. In addition, the policies put into place may further prevent certain actions from being performed with respect to the sender and/or destination of the packet. For example, although one endpoint may generally be authorized by policy to communicate with controller 306, it may be restructured from updating the software of controller 306.

In further embodiments, when the networking equipment 308 determines that a given packet is a control packet, it may also enforce any application-level policies to the packet. For example, assume that a packet is sent to controller 306 from SCADA service 314 using an automation protocol, it may extract any control parameter value(s) present in the payload of the packet and compare them to the application-level policies associated with controller 306. In turn, if the control parameter value(s) violate any of the specified policies, the networking equipment 308 may block the packet from being delivered to controller 306.

By blocking certain control commands send to controller 306, based on their control parameter value(s), the networking equipment 308 can effectively prevent stealthy attacks from being launched in the network against industrial equipment 304 that are intended to either damage equipment or disrupt the industrial process. For example, by restricting the operating range for industrial equipment 304 by policy, even seemly innocuous communications can be blocked from reaching controller 306 and used to control industrial equipment 304.

Figure 6:
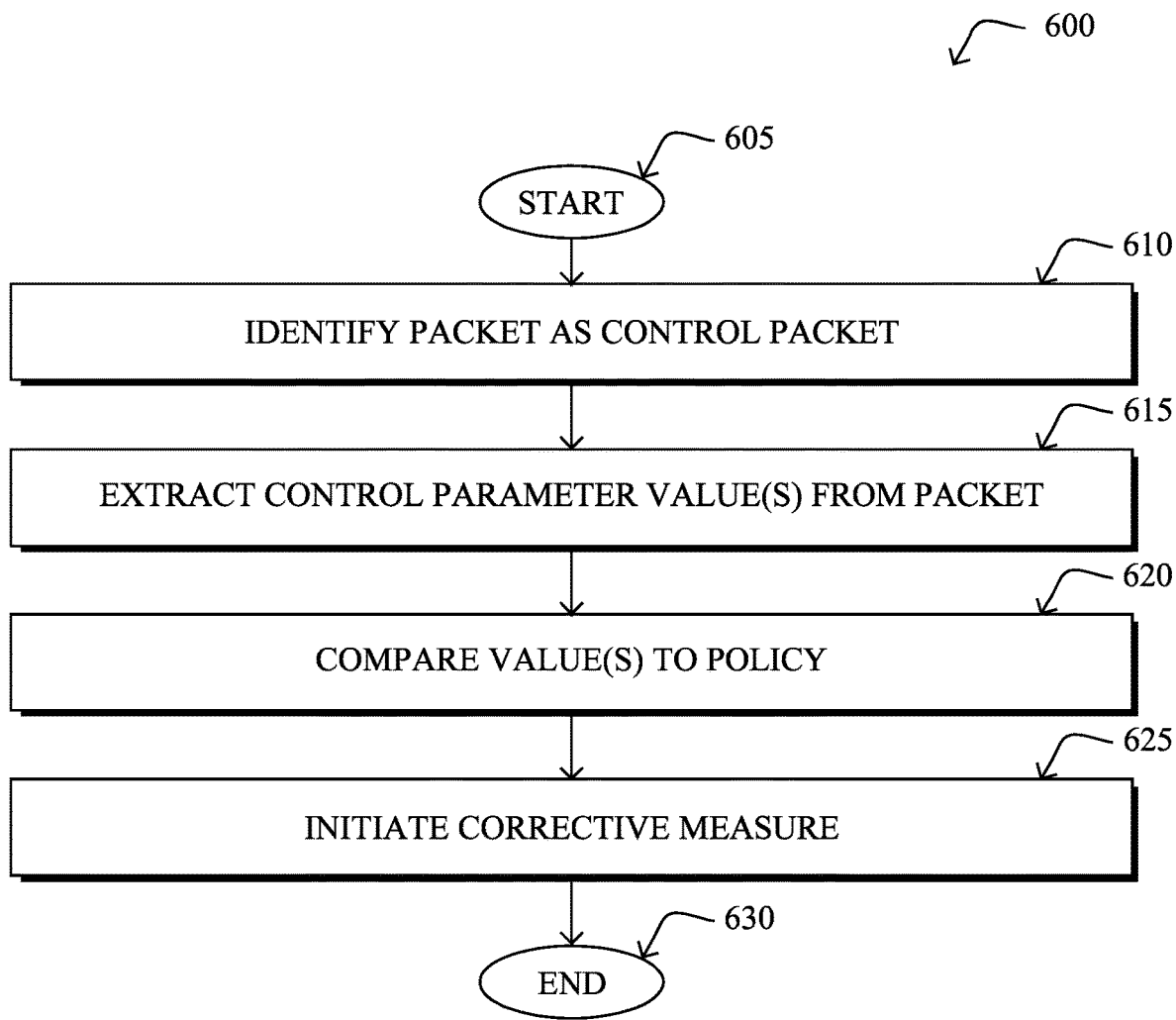
FIG. 6 illustrates an example simplified procedure for enforcing intent-based security for industrial Internet of Things (IoT) networks.

FIG. 6 illustrates an example simplified procedure for enforcing intent-based security for industrial Internet of Things (IoT) network, in accordance with one or more embodiments described herein. In various embodiments, a non-generic, specifically configured device (e.g., device 200) may perform procedure 600 by executing stored instructions (e.g., process 248), such as a router, switch, firewall, or other form of networking equipment in a network through which traffic flows. The procedure 600 may start at step 605, and continues to step 610, where, as described in greater detail above, the device may identify a packet sent via the network towards an endpoint as being a control packet for the endpoint. To do so, for example, the device may identify the packet as using an automation protocol.

At step 615, as detailed above, the device may extract one or more control parameter values from the control packet. As would be appreciated, the specific format for the payload of the packet may differ, depending on the automation protocol in use, the endpoint, etc. For example, the endpoint the endpoint (e.g., a PLC, a VFD, etc.) controls an actuator and the one or more control parameter values affect how the actuator operates. In another example, the one or more control parameter values affect powering of a circuit, such as in the case of a power station or other industrial setting.

At step 620, the device may compare the one or more control parameter values to a policy associated with the endpoint, as described in greater detail above. In various embodiments, such a policy may be based on one or more component tags and one or more activity tags assigned to the endpoint. In general, the policy may define a range or set of one or more values that are acceptable for sending as a control message to the endpoint.

At step 625, as detailed above, the device may initiate a corrective measure, based on a determination that the one or more control parameter values violate the policy associated with the endpoint. In one embodiment, the corrective measure may comprise blocking the packet from being delivered to the endpoint. In another embodiment, the corrective measure may entail sending an alert to a user interface, regardless of whether or not the packet is delivered (e.g., a slightly out of range control parameter value may still be delivered, while further out of range values may be blocked entirely). Procedure 600 then ends at step 630.

The techniques described herein, therefore, allow for intent-based security to be implemented in an IoT network. In some aspects, by learning the intent of an endpoint in the network, policies can be put into place that ensure that the endpoint does not deviate from its expected behavior. In further aspects, application-level policies can even be instantiated to prevent control commands from being sent to the endpoint that could lead to the damage of equipment or disruption of the industrial process controlled by the endpoint.

While there have been shown and described illustrative embodiments for intent-based security for industrial IoT devices, it is to be understood that various other adaptations and modifications may be made within the intent and scope of the embodiments herein. For example, while specific models are shown herein for purposes of illustration, other models may be generated in a similar manner, such as with a different number of types of layers. Further, while the techniques herein are described as being performed by certain locations within a network, the techniques herein could also be performed at other locations, as desired (e.g., fully in the cloud, fully within the local network, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
identifying, by a device in a network, a packet sent via the network towards an endpoint as being a control packet for the endpoint, wherein a sensor module executed by the device analyzes the packet by performing deep packet inspection to identify use of an automation protocol by the packet;
extracting, by the device, one or more control parameter values from the control packet;
assigning, by the device, and to the endpoint, one or more component tags that identify a type and software of the endpoint and one or more activity tags that identify what the endpoint is doing at a protocol level;
comparing, by the device, the one or more control parameter values to a policy associated with the endpoint, wherein the policy associated with the endpoint defines an expected behavior of the endpoint based on the one or more component tags and the one or more activity tags assigned to the endpoint; and
initiating, by the device, a corrective measure, based on a determination that the one or more control parameter values violate the policy associated with the endpoint.

2. The method as in claim 1, wherein initiating the corrective measure comprises:
blocking, by the device, the packet from being delivered to the endpoint.

3. The method as in claim 1, wherein the endpoint controls an actuator, and wherein the one or more control parameter values affect how the actuator operates.

4. The method as in claim 3, wherein the endpoint comprises a programmable logic controller (PLC) or variable-frequency drive (VFD) connected to the actuator.

5. The method as in claim 1, wherein identifying the packet sent via the network towards the endpoint as being a control packet for the endpoint comprises:
identifying the packet as using an automation protocol.

6. The method as in claim 1, wherein the device comprises a network firewall.

7. The method as in claim 1, wherein the one or more control parameter values affect powering of a circuit.

8. An apparatus, comprising:
one or more network interfaces to communicate with a network;
a processor coupled to the one or more network interfaces and configured to execute one or more processes; and
a memory configured to store a process that is executable by the processor, the process when executed configured to:
identify a packet sent via the network towards an endpoint as being a control packet for the endpoint, wherein a sensor module executed by the apparatus analyzes the packet by performing deep packet inspection to identify use of an automation protocol by the packet;
extract one or more control parameter values from the control packet;
assign to the endpoint one or more component tags that identify a type and software of the endpoint and one or more activity tags that identify what the endpoint is doing at a protocol level;
compare the one or more control parameter values to a policy associated with the endpoint, wherein the policy associated with the endpoint defines an expected behavior of the endpoint based on the one or more component tags and the one or more activity tags assigned to the endpoint; and
initiate a corrective measure, based on a determination that the one or more control parameter values violate the policy associated with the endpoint.

9. The apparatus as in claim 8, wherein the corrective measure comprises blocking the packet from being delivered to the endpoint.

10. The apparatus as in claim 8, wherein the endpoint controls an actuator, and wherein the one or more control parameter values affect how the actuator operates.

11. The apparatus as in claim 10, wherein the endpoint comprises a programmable logic controller (PLC) or variable-frequency drive (VFD) connected to the actuator.

12. The apparatus as in claim 8, wherein the apparatus identifies the packet sent via the network towards the endpoint as being a control packet for the endpoint by:
identifying the packet as using an automation protocol.

13. The apparatus as in claim 8, wherein the apparatus comprises a network firewall.

14. The apparatus as in claim 8 wherein the one or more control parameter values affect powering of a circuit.

15. A tangible, non-transitory, computer-readable medium storing program instructions that cause a device in a network to execute a process comprising:
identifying, by the device in the network, a packet sent via the network towards an endpoint as being a control packet for the endpoint, wherein a sensor module executed by the device analyzes the packet by performing deep packet inspection to identify use of an automation protocol by the packet;
extracting, by the device, one or more control parameter values from the control packet;
assigning, by the device, and to the endpoint, one or more component tags that identify a type and software of the endpoint and one or more activity tags that identify what the endpoint is doing at a protocol level;
comparing, by the device, the one or more control parameter values to a policy associated with the endpoint, wherein the policy associated with the endpoint defines an expected behavior of the endpoint based on the one or more component tags and the one or more activity tags assigned to the endpoint; and
initiating, by the device, a corrective measure, based on a determination that the one or more control parameter values violate the policy associated with the endpoint.

16. The computer-readable medium as in claim 15, wherein initiating the corrective measure comprises:
blocking, by the device, the packet from being delivered to the endpoint.

17. The computer-readable medium as in claim 15, wherein the endpoint controls an actuator, and wherein the one or more control parameter values affect how the actuator operates.

18. The computer-readable medium as in claim 17, wherein the endpoint comprises a programmable logic controller (PLC) or variable-frequency drive (VFD) connected to the actuator.

* * * * *